(12) United States Patent
Shiota

(10) Patent No.: US 8,642,983 B2
(45) Date of Patent: Feb. 4, 2014

(54) ELECTROMAGNETIC WAVE EMISSION DEVICE

(75) Inventor: Kazunori Shiota, Miyagi (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 13/609,573

(22) Filed: Sep. 11, 2012

(65) Prior Publication Data
US 2013/0068971 A1 Mar. 21, 2013

(30) Foreign Application Priority Data
Sep. 16, 2011 (JP) ................. 2011-203241

(51) Int. Cl.
*G01J 4/04* (2006.01)
*G01J 5/10* (2006.01)

(52) U.S. Cl.
USPC ....... 250/504 R; 250/351; 359/326; 359/328; 359/332

(58) Field of Classification Search
USPC .............. 250/351, 504 R; 359/326, 328, 332
See application file for complete search history.

(56) References Cited

U.S. PATENT DOCUMENTS

| | | | |
|---|---|---|---|
| 8,210,035 B2 * | 7/2012 | Imamura et al. ........... 73/114.75 |
| 8,253,103 B2 * | 8/2012 | Ogawa et al. .............. 250/336.1 |
| 8,294,121 B2 * | 10/2012 | Naitoh ...................... 250/453.11 |
| 8,305,679 B2 * | 11/2012 | Kondo et al. ................. 359/326 |
| 8,330,110 B2 * | 12/2012 | Nishina et al. ............. 250/341.1 |
| 8,355,197 B2 * | 1/2013 | Kondo et al. ................. 359/330 |
| 8,378,703 B2 * | 2/2013 | Irisawa et al. ............. 324/754.23 |
| 8,384,989 B2 * | 2/2013 | Kondo et al. ................. 359/330 |
| 8,416,408 B1 * | 4/2013 | Herzinger et al. ............ 356/364 |
| 8,492,718 B2 * | 7/2013 | Ogawa et al. .............. 250/336.1 |
| 8,493,057 B2 * | 7/2013 | Nishina et al. ............. 324/76.14 |
| 2012/0049072 A1 * | 3/2012 | Kajiki et al. .................. 250/351 |
| 2012/0212375 A1 * | 8/2012 | Depree, IV ............ 343/700 MS |
| 2012/0286797 A1 * | 11/2012 | Kato et al. ..................... 324/537 |
| 2013/0026368 A1 * | 1/2013 | Herzinger ................. 250/341.3 |
| 2013/0068971 A1 * | 3/2013 | Shiota ....................... 250/504 R |
| 2013/0075597 A1 * | 3/2013 | Shiota et al. ............. 250/227.11 |
| 2013/0181146 A1 * | 7/2013 | Shiota et al. ............. 250/504 R |

FOREIGN PATENT DOCUMENTS

| | | |
|---|---|---|
| JP | 2010-079292 | 4/2010 |
| JP | 2010-204488 | 9/2010 |

OTHER PUBLICATIONS

K. Suizu et al., "Extremely frequency-widened terahertz wave generation using Cherenkov-type radiation", Optics Express, vol. 17, No. 8, Apr. 13, 2009, pp. 6676-6681.

(Continued)

*Primary Examiner* — David A Vanore
(74) *Attorney, Agent, or Firm* — Greenblum & Bernstein, P.L.C.

(57) ABSTRACT

An electromagnetic wave emission device includes a nonlinear crystal, a prism, and a cylindrical lens. The nonlinear crystal has an optical waveguide, receives exciting light having at least two wavelength components, and outputs an electromagnetic wave having a frequency equal to or more than 0.01 [THz] and equal to or less than 100 [THz] by means of the Cherenkov phase matching. The prism includes an electromagnetic wave input surface receiving the electromagnetic wave from the optical waveguide and an electromagnetic wave transmission surface through which the electromagnetic wave which has entered from the electromagnetic wave input surface passes. The cylindrical lens has two bottom surfaces opposed to each other, a flat surface intersecting with the two bottom surfaces, and a curved surface intersecting with the two bottom surfaces and the flat surface, wherein the flat surface is in contact with the electromagnetic wave transmission surface.

14 Claims, 13 Drawing Sheets

(56) References Cited

OTHER PUBLICATIONS

K. Suizu et al., "Monochromatic-Tunable Terahertz-Wave Sources Based on Nonlinear Frequency Conversion Using Lithium Niobate Crystal", IEEE Journal of Selected Topics in Quantam Electronics, vol. 14, No. 2, Mar./Apr. 2008, pp. 295-306.

International Search Report, mailed Aug. 7, 2012, for corresponding International Application No. PCT/JP2012/067019.

* cited by examiner

Portion through which Exciting Light Lp propagates

ELECTROMAGNETIC WAVE EMISSION DEVICE

BACKGROUND ART

1. Technical Field of the Invention

The present invention relates to an emission of an electromagnetic wave (frequency thereof is equal to or more than 0.01 [THz], and equal to or less than 100 [THz]) (such as a terahertz wave (frequency thereof is equal to or more than 0.03 [THz], and equal to or less than 10 [THz]), for example).

2. Related Art

A broadband terahertz wave generation method by means of a difference-frequency terahertz wave generation using the Cherenkov radiation has conventionally been proposed (refer to FIG. 2 of a Non-patent Document 1, and FIG. 1 of a Patent Document 1). Exciting light from a light source (KTP-OPO excited by Nd-YAG laser, for example) outputting two wavelengths is made incident to a nonlinear crystal (MgO-doped LN crystal, for example) according to FIG. 2 of the Non-patent Document 1. The incident exciting light having two wavelengths induces nonlinear polarization in the MgO-doped LN crystal. If the MgO-doped LN crystal satisfies the condition ($n_{THz} > n_{opt}$) of the Cherenkov radiation, a spherical wave which takes a maximal value at each position corresponding to the twice of the coherence length is generated. This spherical wave has wave fronts aligned in a direction of a radiation angle θ satisfying the following relationship, and the terahertz waves are emitted in this direction. In the equation, $n_{opt}$ denotes a refractive index in the exciting light waveband of the MgO-doped LN crystal, and $n_{THz}$ is a refractive index in the terahertz waveband of the MgO-doped LN crystal.

$$\cos \theta = n_{opt}/n_{THz}$$

[Non-patent Document 1] K. Suizu, K. Koketsu, T. Shibuya, T. Tsutsui, T. Akiba, and K. Kawase, "Extremely frequency-widened terahertz wave generation using Cherenkov-type radiation," Opt. Express 17(8), 2009, pp. 6676-6681.

[Patent Document 1] Japanese Patent Application Laid-open No. 2010-204488

SUMMARY OF THE INVENTION

An object of the present invention is to make an output power of terahertz waves to be large.

According to the present invention, an electromagnetic wave emission device, includes: a nonlinear crystal that receives exciting light having at least two wavelength components, outputs an electromagnetic wave having a frequency equal to or more than 0.01 [THz] and equal to or less than 100 [THz] by means of the Cherenkov phase matching, and has an optical waveguide; a prism that includes an electromagnetic wave input surface receiving the electromagnetic wave from the optical waveguide and an electromagnetic wave transmission surface through which the electromagnetic wave which has entered from the electromagnetic wave input surface passes; and a cylindrical lens that has two bottom surfaces opposed to each other, a flat surface intersecting with the two bottom surfaces, and a curved surface intersecting with the two bottom surfaces and the flat surface, wherein the flat surface is in contact with the electromagnetic wave transmission surface.

According to the thus constructed electromagnetic wave emission device, a nonlinear crystal has an optical waveguide, receives exciting light having at least two wavelength components, and outputs an electromagnetic wave having a frequency equal to or more than 0.01 [THz] and equal to or less than 100 [THz] by means of the Cherenkov phase matching. A prism includes an electromagnetic wave input surface receiving the electromagnetic wave from the optical waveguide and an electromagnetic wave transmission surface through which the electromagnetic wave which has entered from the electromagnetic wave input surface passes. A cylindrical lens has two bottom surfaces opposed to each other, a flat surface intersecting with the two bottom surfaces, and a curved surface intersecting with the two bottom surfaces and the flat surface, wherein the flat surface is in contact with the electromagnetic wave transmission surface.

According to the electromagnetic wave emission device of the present invention, the electromagnetic wave transmission surface may be inclined with respect to the electromagnetic wave input surface.

According to the electromagnetic wave emission device of the present invention, the electromagnetic wave transmission surface may intersect with the electromagnetic wave input surface.

According to the electromagnetic wave emission device of the present invention, a distance t between the electromagnetic wave input surface and the electromagnetic wave transmission surface on a cross section of the prism parallel with the two bottom surfaces may be equal to or less than:

$$r/(n_{clad}-1)$$

where r is a radius of the two bottom surfaces, and $n_{clad}$ is a refractive index of the prism at the wavelength of the electromagnetic wave.

According to the electromagnetic wave emission device of the present invention, the electromagnetic wave transmission surface may be separated from the electromagnetic wave input surface.

According to the electromagnetic wave emission device of the present invention, an average of a distance t between the electromagnetic wave input surface and the electromagnetic wave transmission surface on a cross section of the prism parallel with the two bottom surfaces may be:

$$r/n_{clad}$$

where r is a radius of the two bottom surfaces, and $n_{clad}$ is a refractive index of the prism at the wavelength of the electromagnetic wave.

According to the electromagnetic wave emission device of the present invention, the prism and the cylindrical lens may be made of the same material.

According to the electromagnetic wave emission device of the present invention, the prism and the cylindrical lens may be integrally formed.

According to the present invention, the electromagnetic wave emission device may include one of the prism and one of the cylindrical lens.

According to the electromagnetic wave emission device of the present invention, the optical waveguide may be a portion protruding from the nonlinear crystal.

According to the electromagnetic wave emission device of the present invention, the optical waveguide may be a portion in which a predetermined material diffuses in the nonlinear crystal; and the refractive index of the predetermined material at the wavelength of the exciting light may be larger than the refractive index of a portion other than the optical waveguide of the nonlinear crystal at the wavelength of the exciting light.

According to the present invention, the electromagnetic wave emission device may include a buffer layer arranged between the prism and the nonlinear crystal, wherein the thickness of the buffer layer may be thicker than a penetration length of the exciting light, and may be thinner than the wavelength of the electromagnetic wave.

According to the electromagnetic wave emission device of the present invention, a projection of a center axis of the cylindrical lens into the electromagnetic wave input surface may coincide with a symmetrical axis of a projection of the optical waveguide into the electromagnetic wave input surface.

According to the electromagnetic wave emission device of the present invention, a projection of a center axis of the cylindrical lens into the electromagnetic wave input surface may fall within a projection of the optical waveguide into the electromagnetic wave input surface.

BRIEF DESCRIPTION OF THE DRAWINGS

FIG. 8 is a cross sectional view made on the plane indicated by c-c (refer to FIGS. 1 and 2 for the c-c axis) of the electromagnetic wave emission device 1 according to a variation in which the electromagnetic wave transmission surface 16b is separated from the electromagnetic wave input surface 16a;

FIG. 11 is a front view of the electromagnetic wave emission device 1 according to a variation in which the diffused region 10b is provided in place of the protruded portion 10a;

PREFERRED EMBODIMENTS

A description will now be given of an embodiment of the present invention with reference to drawings.

Figure 1:
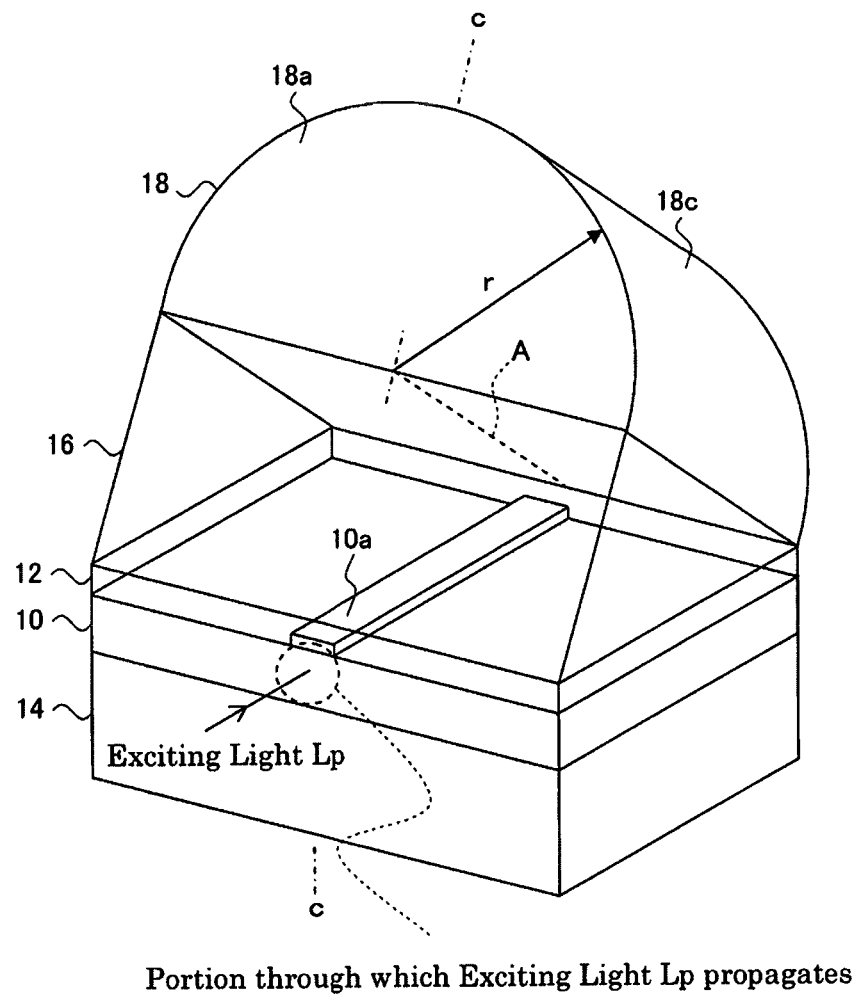
FIG. 1 is a perspective view of an electromagnetic wave emission device 1 according to an embodiment of the present invention.
Figure 2:
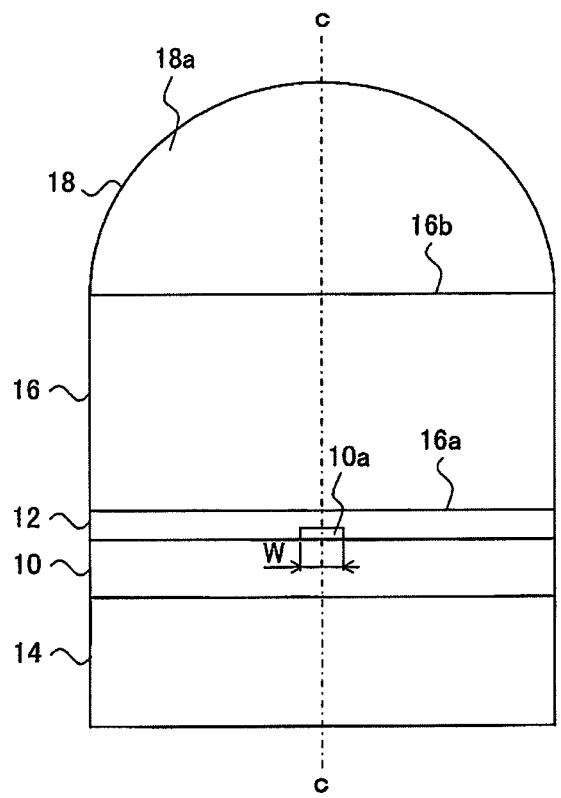
FIG. 2 is a front view of the electromagnetic wave emission device 1.
Figure 3:
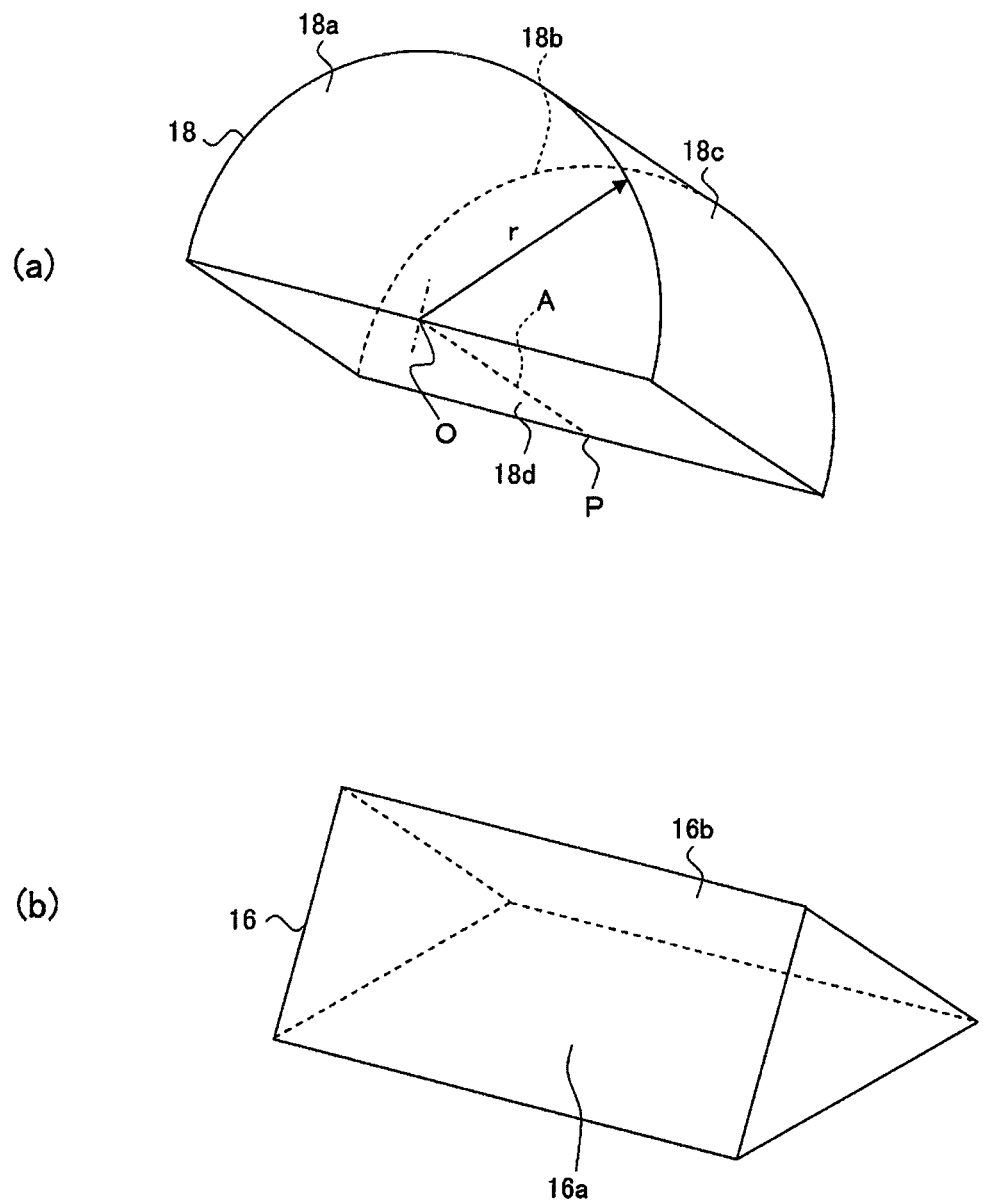
FIG. 3 includes a perspective view (FIG. 3(a)) of a cylindrical lens 18, and a perspective view of a prism 16 (FIG. 3(b))
Figure 4:
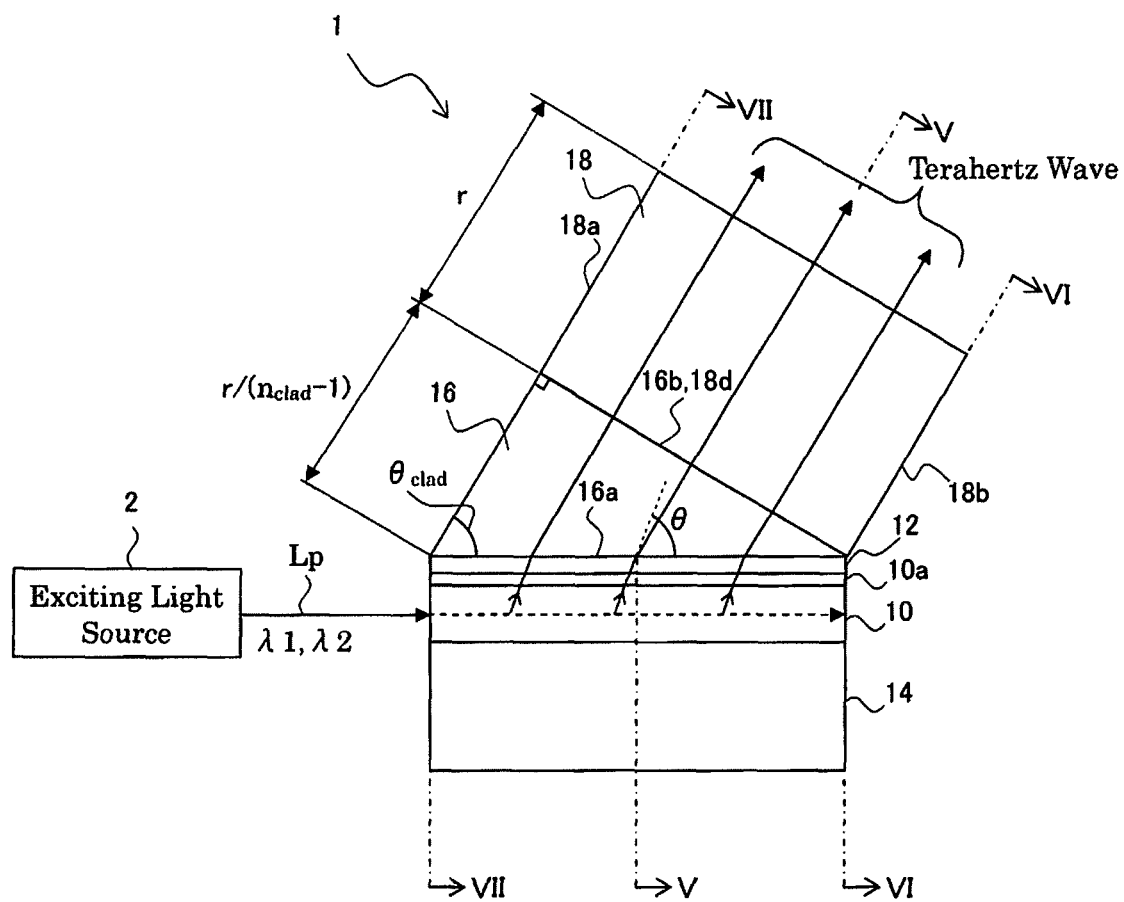
FIG. 4 is a cross sectional view made on a plane indicated by c-c of the electromagnetic wave emission device 1 (refer to FIGS. 1 and 2 for the c-c axis)

FIG. 1 is a perspective view of an electromagnetic wave emission device 1 according to an embodiment of the present invention. FIG. 2 is a front view of the electromagnetic wave emission device 1. FIG. 3 includes a perspective view (FIG. 3(a)) of a cylindrical lens 18, and a perspective view of a prism 16 (FIG. 3(b)). FIG. 4 is a cross sectional view made on a plane indicated by c-c of the electromagnetic wave emission device 1 (refer to FIGS. 1 and 2 for the c-c axis).

The electromagnetic wave emission device 1 emits electromagnetic waves having a frequency equal to or more than 0.01 [THz] and equal to or less than 100 [THz]. The electromagnetic waves emitted from the electromagnetic wave emission device 1 are electromagnetic waves (terahertz waves) in the terahertz waveband (equal to or more than 0.03 [THz] and equal to or less than 10 [THz]), for example. It is assumed that the electromagnetic waves emitted from the electromagnetic wave emission device 1 are terahertz waves in the embodiment of the present invention.

The electromagnetic wave emission device 1 includes an exciting light source 2, a nonlinear crystal 10, a buffer layer 12, a substrate 14, the prism 16, and the cylindrical lens 18.

Referring to FIG. 4, the exciting light source 2 outputs exciting light Lp having two wavelength components (wavelengths λ1 and λ2). The wavelengths λ1 and λ2 take values in a range equal to or more than 1250 nm and equal to or less than 1700 nm. The exciting light Lp is a femtosecond optical pulse, for example. The femtosecond optical pulse includes wavelength components other than the two wavelength components (wavelengths λ1 and λ2), resulting in having two or more wavelength components.

The nonlinear crystal 10 is an MgO-doped LN crystal, for example. The nonlinear crystal 10 has a protruded portion 10a on its surface. The protruded portion 10a is an optical waveguide in a ridge shape as illustrated in FIG. 1. The exciting light Lp is made incident perpendicular on a side surface (namely a YZ plane) of the nonlinear crystal 10. In other words, the side surface of the nonlinear crystal 10 receives the exciting light Lp. It is necessary to increase the power density of the exciting light Lp in order to realize a high output of the terahertz wave emitted by the electromagnetic wave emission device 1. Then, the protruded portion 10a is used to prevent a portion through which the exciting light Lp propagates from extending in the widthwise direction of the nonlinear crystal 10 (referring to FIG. 2, the same direction as the width W of the protruded portion 10a), thereby decreasing the area of a surface for receiving the exciting light Lp (the area of the surface for receiving the exciting light Lp is smaller than the entire side surface of the nonlinear crystal 10), and increasing the power density of the exciting light Lp. The width W (refer to FIG. 2) of the protruded portion 10a is very small compared with the wavelength of the terahertz wave, and is some μm to some tens of μm, for example.

It should be noted that a polarization plane of the exciting light Lp is parallel with a Z axis (axis perpendicular to the page in FIG. 4). The two wavelength components of the exciting light Lp form nonlinear polarization near the protruded portion 10a of the nonlinear crystal 10, and electromagnetic waves (terahertz waves) at a frequency corresponding to the polarization are emitted. It should be noted that if the effective refractive index of the nonlinear crystal 10 at the wavelength of the exciting light Lp is denoted by $n_{opt\_eff}$, and the refractive index of the nonlinear crystal 10 at the wavelength of the terahertz wave is $n_{THz}$, a relationship $n_{THz} > n_{opt\_eff}$ holds true. The refractive indices for the two wavelengths (λ1, λ2) contained in the exciting light Lp are different from each other due to the refractive index dispersion of the nonlinear crystal 10. However, a difference between λ1 and λ2 is very small with respect to the wavelength of the terahertz wave, and influence of the refractive index dispersion between λ1 and λ2 is almost negligible. Thus, the refractive indices ($n_1$, $n_2$) (respectively corresponding to λ1, λ2) of the exciting light Lp (wavelengths λ1, λ2) in the nonlinear crystal 10 are almost equal, and can be considered as $n_{opt\_eff}$.

If an angle satisfying the Cherenkov phase matching is θ, a relationship $\cos θ = (\lambda_{THz}/n_{THz})/(\lambda 1 \, \lambda 2/(n_1 \lambda 2 - n_2 \lambda 1))$ holds true. It should be noted that the wavelength of the terahertz wave is $\lambda_{THz}$.

The terahertz waves, which are spherical waves, are Cherenkov-phase matched, and are emitted from a neighborhood of the protruded portion 10a of the nonlinear crystal 10 in a direction at the angle θ satisfying the Cherenkov phase matching represented by the following equation (refer to FIG. 4). It should be noted that the angle θ is an angle between the travel direction of the exciting light Lp and the travel direction of the terahertz wave referring to FIG. 4. The following equation is an equation if it is considered that $n1 = n2 = n_{opt\_eff}$ in an equation $$\cos θ = (\lambda_{THz}/n_{THz})/(\lambda 1 \, \lambda 2/(n_1 \lambda 2 - n_2 \lambda 1)).$$

$$\cos θ \approx \frac{n_{opt\_eff}}{n_{THz}}$$

The nonlinear crystal 10 is mounted on the substrate 14. It should be noted that the substrate 14 is, via an adhesive, in contact with a surface opposite to the surface of the nonlinear crystal 10 on which the protruded portion 10a is arranged. The substrate 14 is a non-doped LN substrate, for example.

Figure 10:
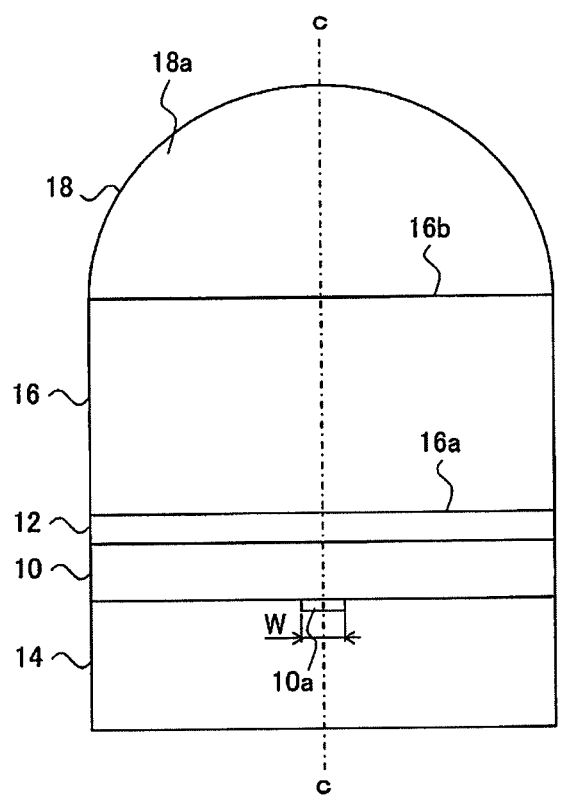
FIG. 10 is a front view of the electromagnetic wave emission device 1 in a variation in which the arrangement of the protruded portion 10a is changed.

It should be noted that, as illustrated in FIG. 10, the protruded portion 10a may be provided on a bottom portion of the nonlinear crystal 10, and, as viewed from the nonlinear crystal 10, the substrate 14 and the protruded portion 10a may be provided on the same side. FIG. 10 is a front view of the electromagnetic wave emission device 1 in a variation in which the arrangement of the protruded portion 10a is changed.

Figure 11:
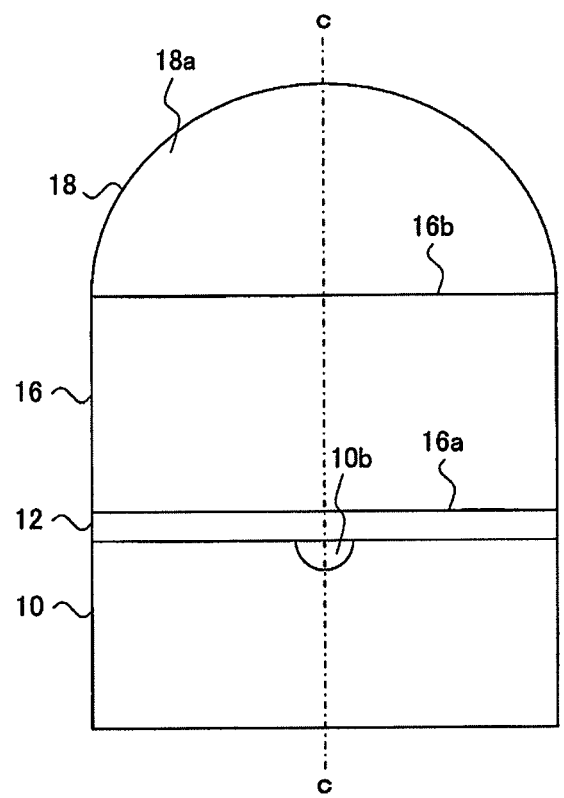

Moreover, a diffused region 10b may be provided, in place of the protruded portion 10a, as shown in FIG. 11. FIG. 11 is a front view of the electromagnetic wave emission device 1 according to a variation in which the diffused region 10b is provided in place of the protruded portion 10a.

Referring to FIG. 11, the diffused region 10b is an optical waveguide, and is a portion in which a predetermined material (such as Ti) is diffused inside the nonlinear crystal 10. It should be noted that the predetermined material (such as Ti) of the diffused region 10b is higher in the refractive index at the wavelength of the exciting light Lp than portions other than the diffused region (optical waveguide) 10b of the nonlinear crystal 10. As a result, the exciting light Lp is confined in the inside of the diffused region 10b, resulting in an increase in power density. It should be noted that though the diffused region 10b is provided in the top portion of the nonlinear crystal 10 in FIG. 11, the diffused region 10b may be provided in the bottom portion.

The buffer layer 12 covers the surface of the nonlinear crystal 10 on which the protruded portion 10a is provided and the protruded portion 10a. The refractive index of the exciting light Lp (wavelengths λ1 and λ2) in the buffer layer 12 is smaller than the effective refractive index of the exciting light Lp (wavelengths λ1 and λ2) in the protruded portion 10a of the nonlinear crystal 10. Moreover, the thickness of the buffer layer 12 is set to be more than the penetration length ξ of the exciting light Lp, and to be less than the wavelength $\lambda_{THz}$ of the terahertz waves to be extracted to the outside of the electromagnetic wave emission device 1. As a result, even if the refractive index of the exciting light Lp in the prism 16 is larger than the effective refractive index of the exciting light Lp in the nonlinear crystal 10, it is possible to cause the terahertz wave to transmit through the buffer layer 12 while the exciting light Lp is confined in a neighborhood of the protruded portion 10a.

The prism 16 includes an electromagnetic wave input surface 16a and an electromagnetic wave transmission surface 16b (refer to FIG. 3(b) and FIG. 4). The electromagnetic wave input surface 16a is in contact with the buffer layer 12, and receives the terahertz waves from the neighborhood of the protruded portion 10a. The electromagnetic wave transmission surface 16b is a surface through which the terahertz waves which have entered from the electromagnetic wave input surface 16a transmit.

The electromagnetic wave input surface 16a is tilted with respective to the electromagnetic wave transmission surface 16b. The electromagnetic wave transmission surface 16b intersects with the electromagnetic wave input surface 16a.

Absorption of the terahertz waves is preferably small in order to reduce a transmission loss of the terahertz waves in the prism 16. A material of the prism 16 is thus high-resistivity silicone or germanium, for example.

The cylindrical lens 18 includes bottom surfaces 18a and 18b, a flat surface 18d, and a curved surface 18c. The bottom surface 18a and the bottom surface 18b (refer to FIG. 3(a) and FIG. 4) are two parallel bottom surfaces opposed to each other. It should be noted that the bottom surface 18a and the bottom surface 18b are both the same semicircles (radius is r). The flat surface 18d (refer to FIG. 3(a) and FIG. 4) is a flat surface, which intersects with the bottom surface 18a and the bottom surface 18b, and is in contact with the electromagnetic wave transmission surface 16b. The curved surface 18c intersects with the bottom surface 18a, the bottom surface 18b, and the flat surface 18d.

It should be noted that a center axis A (refer to FIG. 1 and FIG. 3(a)) of the cylindrical lens 18 is a straight line connecting a center O of the semicircular bottom surface 18a and a center P of the semicircular bottom surface 18b. The center axis A is also a straight line on the flat surface 18d.

Absorption of the terahertz waves is preferably small in order to reduce a transmission loss of the terahertz waves in the cylindrical lens 18. A material of the cylindrical lens 18 is thus high-resistivity silicone or germanium, for example.

It should be noted that the prism 16 and the cylindrical lens 18 may be formed of the same material, and a description is given in the following section while assuming that both are formed of the same material (the refractive indices thereof are also the same). Moreover, the prism 16 and the cylindrical lens 18 are independent of each other in the above description. However, the prism 16 and the cylindrical lens 18 may be integrally formed. This is because an energy loss of the terahertz waves on an interface between the prism 16 and the cylindrical lens 18 can be restrained.

Moreover, referring to FIG. 2, the side surface of the protruded portion 10a is a rectangle, and is line-symmetrical about an axis c-c as an axis of symmetry. Moreover, the bottom surface 18a of the cylindrical lens 18 is also line-symmetrical about the c-c axis as the axis of symmetry. In other words, the cylindrical lens 18 is arranged approximately immediately above the protruded portion 10a.

Figure 12:
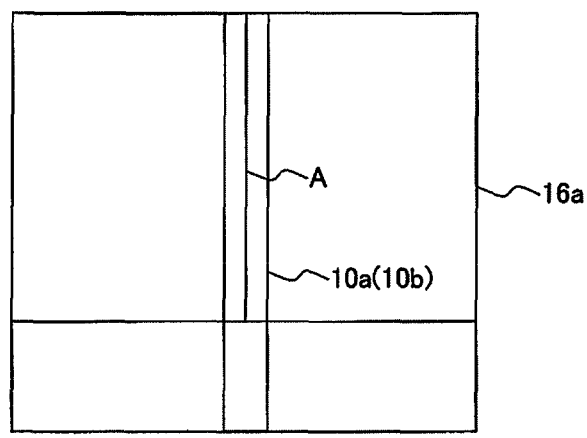
FIG. 12 is a plan view of the electromagnetic wave emission device 1.

FIG. 12 is a plan view of the electromagnetic wave emission device 1. The cylindrical lens 18 is not shown, and the prism 16 is perspectively viewed. Projections of the center axis A and the optical waveguide (the protruded portion 10a or the diffused region 10b) in the electromagnetic wave input surface 16a are shown in FIG. 12.

The projection of the center axis A of the cylindrical lens 18 in the electromagnetic wave input surface 16a preferably coincides with the axis of symmetry of the projection of the optical waveguide (the protruded portion 10a or the diffused region 10b) in the electromagnetic wave input surface 16a. It should be noted that it is only necessary that the projection of the center axis A of the cylindrical lens 18 in the electromagnetic wave input surface 16a is within the projection of the optical waveguide (the protruded portion 10a or the diffused region 10b) in the electromagnetic wave input surface 16a.

A description will now be given of an operation of the embodiment of the present invention.

The exciting light Lp is fed to the nonlinear crystal 10 from the exciting light source 2. The exciting light Lp travels approximately straight in the neighborhood of the protruded portion 10a. The two wavelength components (wavelengths λ1 and λ2) of the exciting light Lp form the nonlinear polarization near the protruded portion 10a of the nonlinear crystal 10, and the terahertz waves having the frequency corresponding to the polarization are emitted. Moreover, the travel direction of the terahertz waves emitted from the neighborhood of the protruded portion 10a of the nonlinear crystal 10 satisfying the condition $n_{THz} > n_{opt\_eff}$ forms the angle θ satisfying the Cherenkov phase matching with respect to the travel direction of the exciting light Lp (refer to FIG. 4).

The terahertz waves emitted from the neighborhood of the protruded portion 10a transmit through the buffer layer 12. On this occasion, the angle between the travel directions of the terahertz waves and the travel direction of the exciting light Lp is θ. After the transmission through the buffer layer 12, the terahertz waves refract when the terahertz waves transmit through the electromagnetic wave input surface 16a of the prism 16, and the angle between the travel direction of the terahertz waves and the travel direction of the exciting light Lp becomes $\theta_{clad}$ thereafter. It should be noted that $\theta_{clad}$ is represented by the following equation.

$$\cos \theta_{clad} \approx \frac{n_{opt\_eff}}{n_{clad}}$$

where $n_{clad}$ is a refractive index of the prism 16 at the wavelength of the terahertz wave. Moreover, a relationship $n_{clad} > n_{opt\_eff}$ holds true.

For example, if $n_{opt\_eff}=2.2$ and $n_{clad}=3.4$, $\theta_{clad}=50°$.

The electromagnetic wave transmission surface 16b is perpendicular to the travel direction of the terahertz waves in the prism 16 on the c-c cross section (refer to FIG. 4). The terahertz waves transmit through the electromagnetic wave transmission surface 16b traveling straight without refraction. The terahertz waves travel straight in the cylindrical lens 18, and directly transmit through the cylindrical lens 18 without refraction in the c-c cross section (refer to FIG. 4).

A description will now be given of the travel direction of the terahertz wave in portions other than the c-c cross section (refer to FIG. 4).

Figure 5:
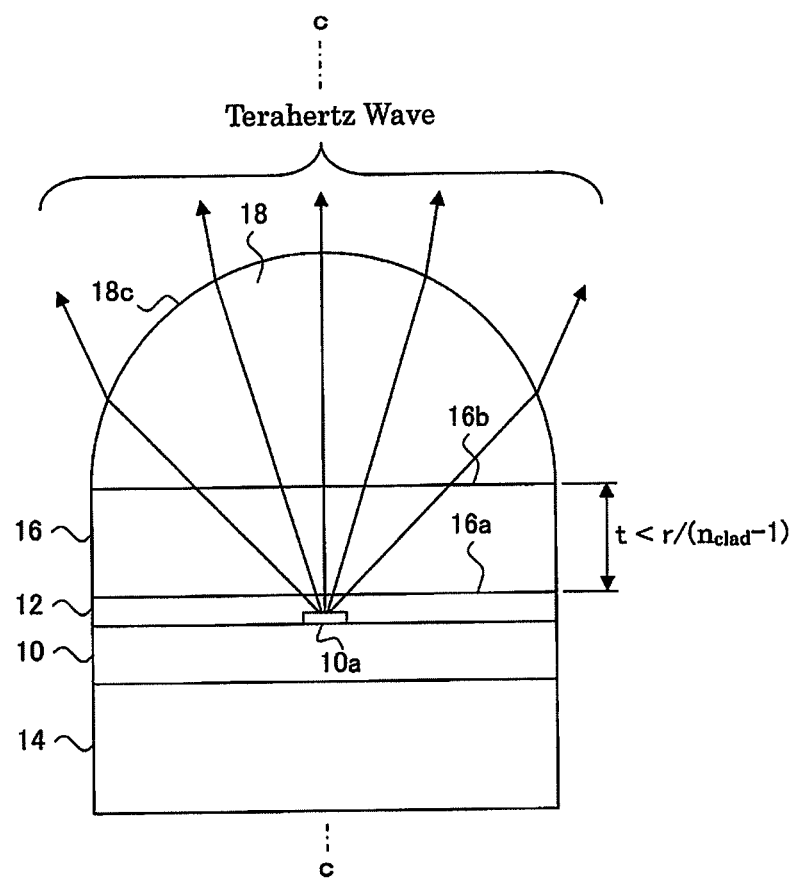
FIG. 5 is a cross sectional view of the electromagnetic wave emission device 1 according to the embodiment of the present invention, and is a view of a cross section of the prism 16 and the cylindrical lens 18 made on a plane parallel with the two bottom surfaces 18a and 18b, and is also a view of a cross section of the nonlinear crystal 10, the buffer layer 12, and the substrate 14 made on a plane perpendicular to the exciting light Lp.

FIG. 5 is a cross sectional view of the electromagnetic wave emission device 1 according to the embodiment of the present invention, and is a view of a cross section of the prism 16 and the cylindrical lens 18 made on a plane parallel with the two bottom surfaces 18a and 18b, and is also a view of a cross section of the nonlinear crystal 10, the buffer layer 12, and the substrate 14 made on a plane perpendicular to the exciting light Lp.

A distance between the electromagnetic wave input surface 16a and the electromagnetic wave transmission surface 16b on a cross section of the prism 16 on a plane parallel with the two bottom surfaces 18a and 18b is t. Then, referring to FIG. 4, t is equal to or more than 0, and is equal to or less than $r/(n_{clad}-1)$. A relationship $t < r/(n_{clad}-1)$ holds true in FIG. 5. It should be noted that the refraction of the terahertz wave upon the transmission through the electromagnetic wave input surface 16a is omitted for the sake of illustration in FIG. 5 (also in FIG. 6 and FIG. 7).

The terahertz waves transmit through the electromagnetic wave input surface 16a, and travel straight in the prism 16. On this occasion, a case without the cylindrical lens 18 is compared with this embodiment.

Figure 9:
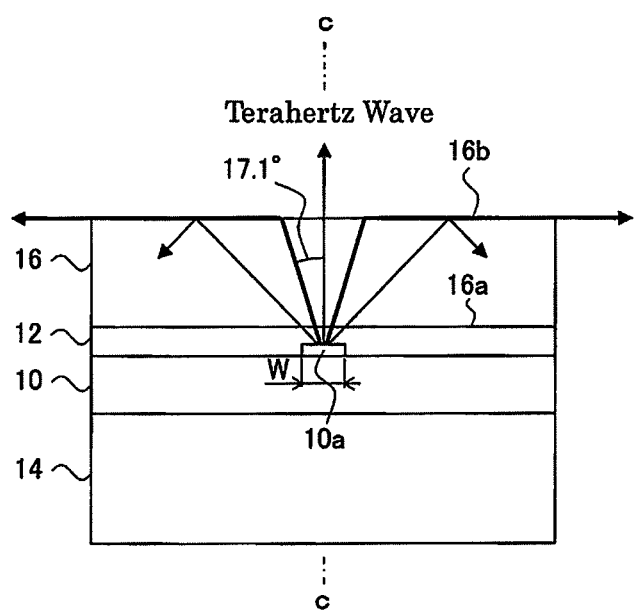
FIG. 9 shows the comparative example assuming the cylindrical lens 18 is eliminated from the electromagnetic wave emission device 1 according to the embodiment of the present invention.

FIG. 9 shows the comparative example assuming the cylindrical lens 18 is eliminated from the electromagnetic wave emission device 1 according to the embodiment of the present invention. It should be noted that the cross section is made at the same position as of FIG. 5.

The terahertz waves diffract in the direction of the width W of the protruded portion 10a in the comparative example. Thus, if the travel direction of the terahertz wave is displaced from the c-c axis by an angle equal to or more than a slight angle, the terahertz wave is fully reflected by the electromagnetic wave transmission surface 16b. As a result, the output of the terahertz waves emitted by the electromagnetic wave emission device 1 decreases. It should be noted that the slight angle is 17.1°, for example. It should be noted that the refractive index of the terahertz wave in the prism 16 is 3.4, and the refractive index of the terahertz wave in the air is 1.

On this occasion, the description of the embodiment of the present invention continues referring to FIG. 5 again. The terahertz waves, which have traveled straight in the prism 16, transmit through the electromagnetic wave transmission surface 16b, and directly travel straight in the cylindrical lens 18 without refraction. It should be noted that the prism 16 and the cylindrical lens 18 are made of the same material. The terahertz waves then refract during the transmission through the cylindrical lens 18, the cross section of the cylindrical lens 18 forms a semicircular arc, and the terahertz waves refract so as to slightly approach the c-c axis. On this occasion, even if the travel directions of the terahertz waves depart from the c-c axis by a certain degree, the terahertz waves are not totally reflected by the curved surface 18c. Thus, more terahertz waves can be extracted from the electromagnetic wave emission device 1 than in the comparative example (without the cylindrical lens 18) in FIG. 9.

Figure 6:
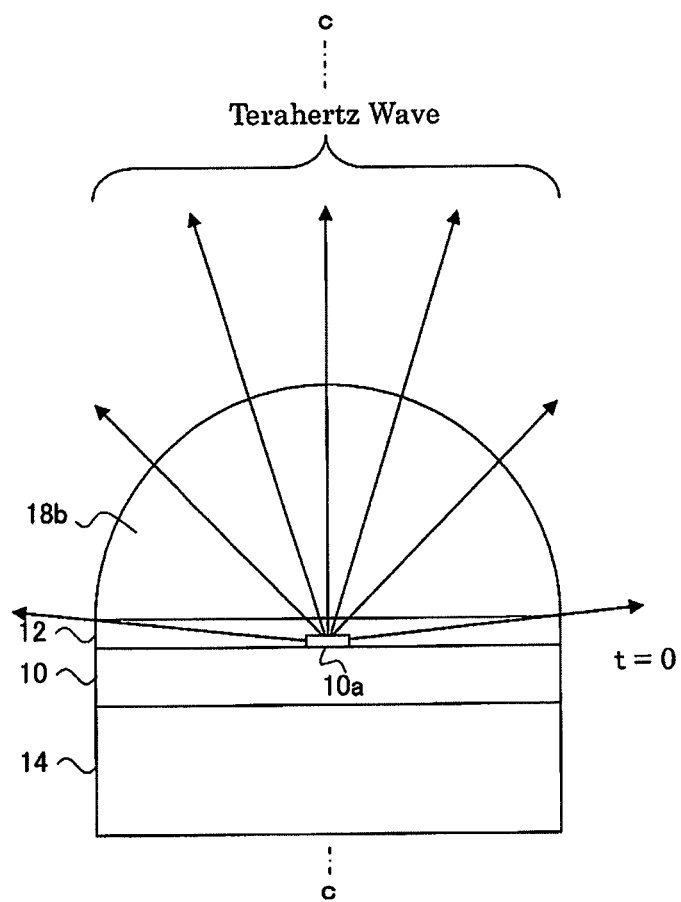
FIG. 6 is a cross sectional view of the electromagnetic wave emission device 1 according to the embodiment of the present invention, and is a view of a cross section of the prism 16 and the cylindrical lens 18 made on the bottom surface 18b, and is also a view of a cross section of the nonlinear crystal 10, the buffer layer 12, and the substrate 14 made on a plane perpendicular to the exciting light Lp.

FIG. 6 is a cross sectional view of the electromagnetic wave emission device 1 according to the embodiment of the present invention, and is a view of a cross section of the prism 16 and the cylindrical lens 18 made on the bottom surface 18b, and is also a view of a cross section of the nonlinear crystal 10, the buffer layer 12, and the substrate 14 made on a plane perpendicular to the exciting light Lp. A relationship t=0 holds true in FIG. 6.

The terahertz waves emitted from the neighborhood of the protruded portion 10a transmit through the buffer layer 12, and travels straight in the cylindrical lens 18. Since the protruded portion 10a is arranged approximately at the center of the semicircle of the cross section of the cylindrical lens 18, the terahertz waves travel straight with almost no refraction upon the transmission of the cylindrical lens 18. Thus, more terahertz waves can be extracted from the electromagnetic wave emission device 1 than in the comparative example (without the cylindrical lens 18) in FIG. 9.

Figure 7:
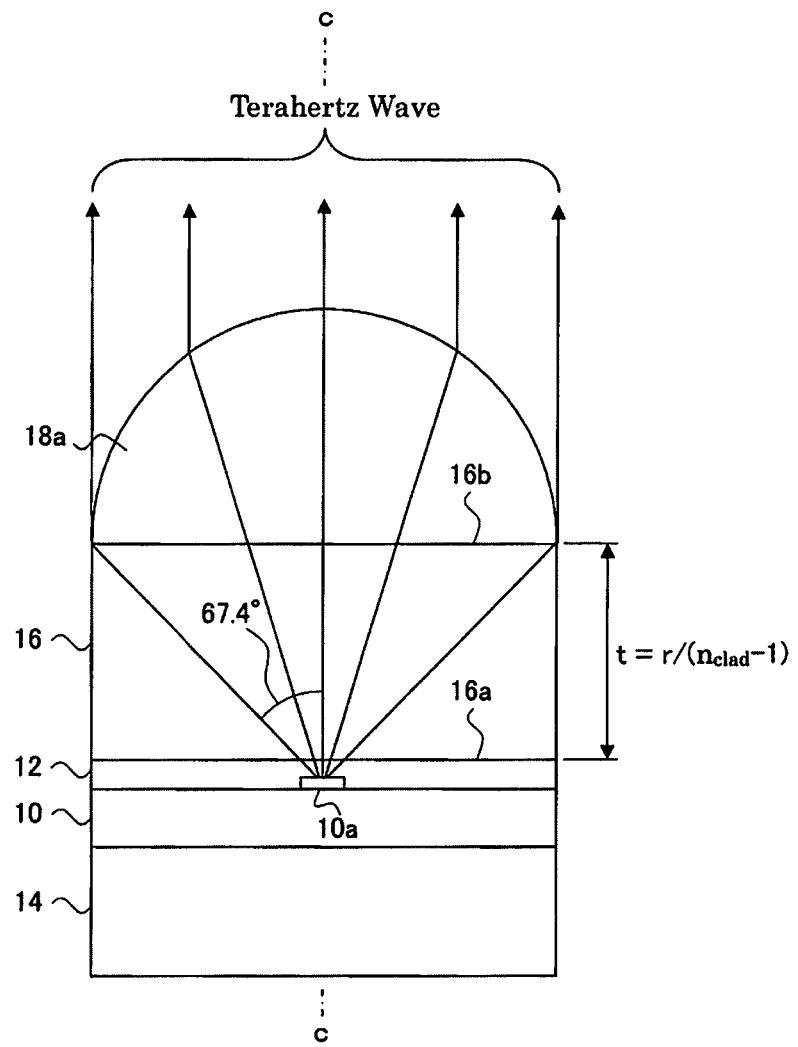
FIG. 7 is a cross sectional view of the electromagnetic wave emission device 1 according to the embodiment of the present invention, and is a view of a cross section of the prism 16 and the cylindrical lens 18 made on the bottom surface 18a, and is also a view of a cross section of the nonlinear crystal 10, the buffer layer 12, and the substrate 14 made on a plane perpendicular to the exciting light Lp.

FIG. 7 is a cross sectional view of the electromagnetic wave emission device 1 according to the embodiment of the present invention, and is a view of a cross section of the prism 16 and the cylindrical lens 18 made on the bottom surface 18a, and is also a view of a cross section of the nonlinear crystal 10, the buffer layer 12, and the substrate 14 made on a plane perpendicular to the exciting light Lp. A relationship $t=r/(n_{clad}-1)$ holds true in FIG. 7.

The terahertz waves emitted from the neighborhood of the protruded portion 10a transmit through the buffer layer 12, travel straight in the prism 16, transmit through the electromagnetic wave transmission surface 16b, and further travel straight in the cylindrical lens 18 without refraction. It should be noted that the prism 16 and the cylindrical lens 18 are made of the same material. Then, though the terahertz waves refract during the transmission through the cylindrical lens 18, the relationship $t=r/(n_{clad}-1)$ holds true, and the terahertz waves travel in the direction parallel with the c-c axis. In other words, the terahertz waves are collimated. Thus, more terahertz waves can be extracted from the electromagnetic wave emission device 1 than in the comparative example (without the cylindrical lens 18) in FIG. 9.

For example, in a case in which r=5 mm, and t=2.08 mm, even if the travel direction of the terahertz wave is departed from the c-c axis by 67.4°, the terahertz wave can be extracted to the outside (air layer) of the electromagnetic wave emission device 1, resulting in a large output improvement.

It should be noted that the electromagnetic wave transmission surface 16b is an equiphase surface on which wave fronts of the terahertz waves are aligned. The terahertz waves are made incident to the cylindrical lens 18 in the equiphase, and, if there are multiple prisms 16 and cylindrical lenses 18, the terahertz waves output from the respective cylindrical lenses 18 are different in phase. The electromagnetic wave emission device 1 then preferably includes respective one of the prism 16 and the cylindrical lens 18.

The embodiment of the present invention provides the following effects.

If none is arranged on the protruded portion 10a, the terahertz waves generated in the neighborhood of the protruded portion 10a are fully reflected on the interface between the protruded portion 10a and the air, and cannot be extracted to the outside of the protruded portion 10a. Then, according to this embodiment of the present invention, the prism 16 is arranged on the protruded portion 10a, thereby extracting the terahertz waves to the outside of the protruded portion 10a.

If none is arranged on the prism 16 as in the comparative example shown in FIG. 9, and the travel directions of the terahertz waves are displaced by a slight angle from the c-c axis, the terahertz waves are fully reflected by the electromagnetic wave transmission surface 16b. Then, the cylindrical lens 18 is arranged on the prism 16 according to the embodiment of the present invention, and even if the travel direction of the terahertz wave is fairly departed from the c-c axis, (by 67.4° in the above-mentioned embodiment), the terahertz wave can be extracted to the outside of the electromagnetic wave emission device 1. As a result, the output power of the terahertz waves of the electromagnetic wave emission device 1 can be large.

Though the description that t is equal to or more than 0, and equal to or less than $r/(n_{clad}-1)$ is given, if convergence of the terahertz waves by the cylindrical lens 18 is permissible, t may exceed $r/(n_{clad}-1)$.

It should be noted that the electromagnetic wave transmission surface 16b intersects with the electromagnetic wave input surface 16a in the embodiment. However, the electromagnetic wave transmission surface 16b may be separated from the electromagnetic wave input surface 16a.

Figure 8:
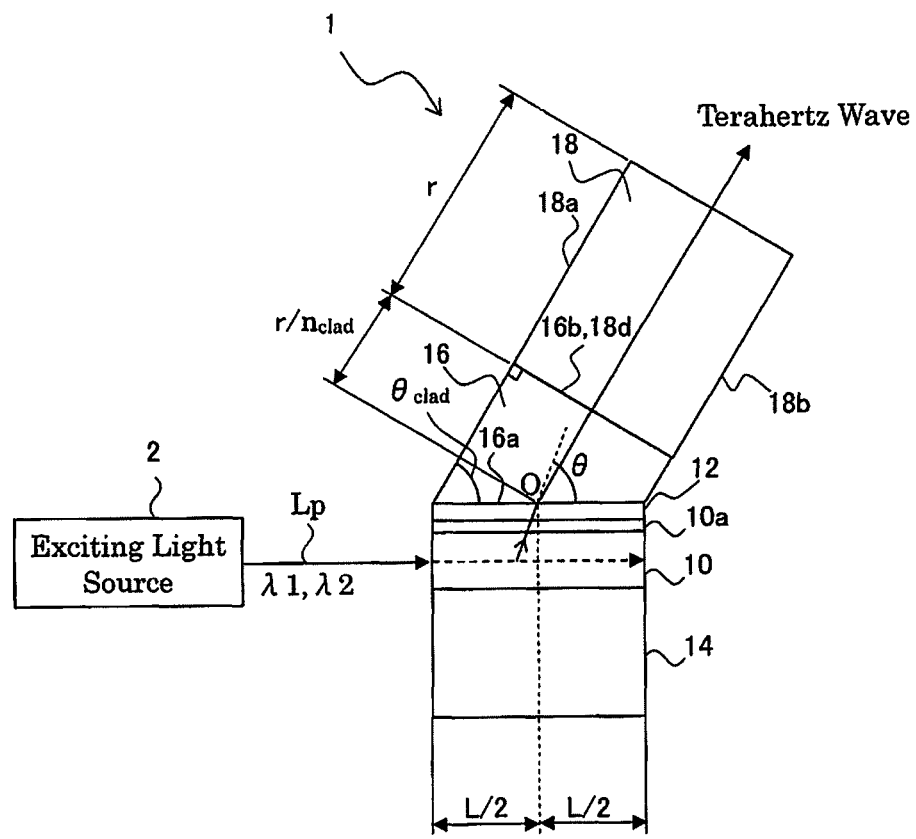

FIG. 8 is a cross sectional view made on the plane indicated by c-c (refer to FIGS. 1 and 2 for the c-c axis) of the electromagnetic wave emission device 1 according to a variation in which the electromagnetic wave transmission surface 16b is separated from the electromagnetic wave input surface 16a.

The length of the protruded portion 10a is L/2+L/2=L referring to FIG. 8. A point immediately above the center point in the lengthwise direction of the protruded portion 10a on the electromagnetic wave input surface 16a is referred to as a point O. A distance to between the electromagnetic wave input surface 16a and the electromagnetic wave transmission surface 16b on a cross section of the prism 16 on a plane passing through the point O, and parallel with the two bottom surfaces 18a and 18b is $r/n_{clad}$. The minimum value of distance t is $r/n_{clad}-(L/2)\cos\theta_{clad}$, and the maximum value of distance t is $r/n_{clad}+(L/2)\cos\theta_{clad}$. An average of distance t is $r/n_{clad}$.

It is possible to minimize the spherical aberration of the cylindrical lens 18 for a component, which spreads in the width W direction of the protruded portion 10a, of the terahertz wave generated at the center point in the lengthwise direction of the protruded portion 10a by setting the average of the distance t to $r/n_{clad}$.

Figure 13:
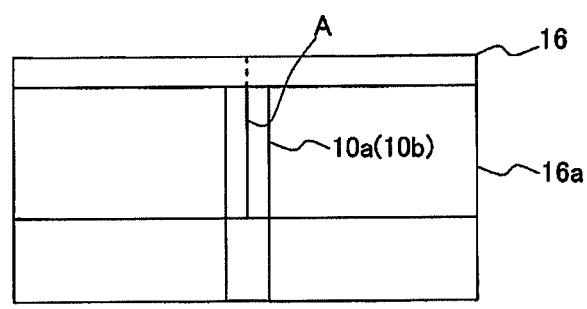
FIG. 13 is a plan view of the electromagnetic wave emission device 1 according to the variation.

FIG. 13 is a plan view of the electromagnetic wave emission device 1 according to the variation. For the variation, refer to FIG. 8. The cylindrical lens 18 is not shown, and the prism 16 is perspectively viewed through. Projections of the center axis A and the optical waveguide (the protruded portion 10a or the diffused region 10b) in the electromagnetic wave input surface 16a are shown in FIG. 13. It should be noted that a portion outside the electromagnetic wave input surface 16a out of the projection of the center axis A to the plane containing the electromagnetic wave input surface 16a is represented by a dotted line.

The projection of the center axis A of the cylindrical lens 18 in the electromagnetic wave input surface 16a preferably coincides with the axis of symmetry of the projection of the optical waveguide (the protruded portion 10a or the diffused region 10b) in the electromagnetic wave input surface 16a. It should be noted that it is only necessary that the projection of the center axis A of the cylindrical lens 18 in the electromagnetic wave input surface 16a is within the projection of the optical waveguide (the protruded portion 10a or the diffused region 10b) in the electromagnetic wave input surface 16a.

The invention claimed is:

1. An electromagnetic wave emission device, comprising:
   a nonlinear crystal that receives exciting light having at least two wavelength components, outputs an electromagnetic wave having a frequency equal to or more than 0.01 [THz] and equal to or less than 100 [THz] by means of the Cherenkov phase matching, and has an optical waveguide;
   a prism that includes an electromagnetic wave input surface receiving the electromagnetic wave from the optical waveguide and an electromagnetic wave transmission surface through which the electromagnetic wave which has entered from the electromagnetic wave input surface passes; and a cylindrical lens that has two bottom surfaces opposed to each other, a flat surface intersecting with the two bottom surfaces, and a curved surface intersecting with the two bottom surfaces and the flat surface, wherein the flat surface is in contact with the electromagnetic wave transmission surface.

2. The electromagnetic wave emission device according to claim 1, wherein the electromagnetic wave transmission surface is inclined with respect to the electromagnetic wave input surface.

3. The electromagnetic wave emission device according to claim 2, wherein the electromagnetic wave transmission surface intersects with the electromagnetic wave input surface.

4. The electromagnetic wave emission device according to claim 3, wherein a distance t between the electromagnetic wave input surface and the electromagnetic wave transmission surface on a cross section of the prism parallel with the two bottom surfaces is equal to or less than:

$$r/(n_{clad}-1)$$

where r is a radius of the two bottom surfaces, and $n_{clad}$ is a refractive index of the prism at the wavelength of the electromagnetic wave.

5. The electromagnetic wave emission device according to claim 2, wherein the electromagnetic wave transmission surface is separated from the electromagnetic wave input surface.

6. The electromagnetic wave emission device according to claim 5, wherein an average of a distance t between the electromagnetic wave input surface and the electromagnetic wave transmission surface on a cross section of the prism parallel with the two bottom surfaces is:

$$r/n_{clad}$$

where r is a radius of the two bottom surfaces, and $n_{clad}$ is a refractive index of the prism at the wavelength of the electromagnetic wave.

7. The electromagnetic wave emission device according to claim 1, wherein the prism and the cylindrical lens are made of the same material.

8. The electromagnetic wave emission device according to claim 7, wherein the prism and the cylindrical lens are integrally formed.

9. The electromagnetic wave emission device according to claim 1, comprising one of the prism and one of the cylindrical lens.

10. The electromagnetic wave emission device according to claim 1, wherein the optical waveguide is a portion protruding from the nonlinear crystal.

11. The electromagnetic wave emission device according to claim 1, wherein:

the optical waveguide is a portion in which a predetermined material diffuses in the nonlinear crystal; and the refractive index of the predetermined material at the wavelength of the exciting light is larger than the refractive index of a portion other than the optical waveguide of the nonlinear crystal at the wavelength of the exciting light.

12. The electromagnetic wave emission device according to claim 1, comprising a buffer layer arranged between the prism and the nonlinear crystal, wherein the thickness of the buffer layer is thicker than a penetration length of the exciting light, and is thinner than the wavelength of the electromagnetic wave.

13. The electromagnetic wave emission device according to claim 1, wherein a projection of a center axis of the cylindrical lens into the electromagnetic wave input surface coincides with a symmetrical axis of a projection of the optical waveguide into the electromagnetic wave input surface.

14. The electromagnetic wave emission device according to claim 1, wherein a projection of a center axis of the cylindrical lens into the electromagnetic wave input surface falls within a projection of the optical waveguide into the electromagnetic wave input surface.

* * * * *